US012752224B2

(12) United States Patent
Sun, Sr.

(10) Patent No.: US 12,752,224 B2
(45) Date of Patent: Oct. 6, 2026

(54) CONDENSATION DEDUST-DEMISTER SET

(71) Applicant: Houjie Sun, Sr., Huizhou (CN)

(72) Inventor: Houjie Sun, Sr., Huizhou (CN)

(*) Notice: Subject to any disclaimer, the term of this patent is extended or adjusted under 35 U.S.C. 154(b) by 249 days.

(21) Appl. No.: 16/485,801

(22) PCT Filed: Jan. 26, 2018

(86) PCT No.: PCT/CN2018/000052
§ 371 (c)(1),
(2) Date: May 7, 2020

(87) PCT Pub. No.: WO2018/157663
PCT Pub. Date: Sep. 7, 2018

(65) Prior Publication Data
US 2021/0023488 A1 Jan. 28, 2021

(30) Foreign Application Priority Data
Mar. 2, 2017 (CN) ......................... 201710119152.7
May 15, 2017 (CN) ......................... 201710337778.5

(51) Int. Cl.
*B01D 45/08* (2006.01)
*B01D 1/30* (2006.01)
*B01D 50/00* (2022.01)
*B01D 51/02* (2006.01)
*B01D 53/26* (2006.01)
*F23J 15/06* (2006.01)
(Continued)

(52) U.S. Cl.
CPC ............. *B01D 45/08* (2013.01); *B01D 1/305* (2013.01); *B01D 50/00* (2013.01); *B01D 51/02* (2013.01); *B01D 53/265* (2013.01); *F23J 15/06* (2013.01); *F28B 7/00* (2013.01); *B01D 2258/0283* (2013.01); *F28F 1/02* (2013.01); *F28F 1/06* (2013.01); *F28F 1/10* (2013.01)

(58) Field of Classification Search
None
See application file for complete search history.

(56) References Cited

FOREIGN PATENT DOCUMENTS

CN 204799047 U * 11/2015 ............ B01D 50/00
CN 103968405 B * 2/2016
(Continued)

OTHER PUBLICATIONS

CN204799047U_ENG (IP.com translation of Cheng) (Year: 2015).*
(Continued)

*Primary Examiner* — Gabriel E Gitman

(57) ABSTRACT

A condensation dedust-demister device, comprises at least one of the followings: a condensator, a refluent demister, a large curve demister, a mixed curve demister and a super-sine demister etc.. Said condensator designed as the first class as tube demister with shell/cavity style pipeline refrigerating system or cooling system can condense dust into mist/haze, consequently by centrifugal effect said refluent demister and so on can collect and dedust-demist what condensator condensed, with the assisting of collecting liquid wall, drain as well as multiple classes composition of various demister, the condensation dedust-demister set can dedust flue gas to 0 mg/Nm3 and demist to 10 mg/Nm3 when raw gas containing dust less than 20 mg/Nm3, at the same time, this set can remove grains of aerosol of SO3 and Hg0 etc. due to be condensed to haze by said condensator.

6 Claims, 12 Drawing Sheets

(51) Int. Cl.

| | |
|---|---|
| ***F28B 7/00*** | (2006.01) |
| *F28F 1/02* | (2006.01) |
| *F28F 1/06* | (2006.01) |
| *F28F 1/10* | (2006.01) |

(56) References Cited

FOREIGN PATENT DOCUMENTS

| | | | | |
|---|---|---|---|---|
| CN | 105983287 | A | * | 10/2016 |
| CN | 106362538 | A | * | 2/2017 |
| CN | 106422617 | A | * | 2/2017 |
| RU | 2527772 | C1 | * | 9/2014 |
| WO | WO-2006079379 | A1 | * | 8/2006 |

OTHER PUBLICATIONS

WO2006079379A1_ENG (Espacenet machine translation of Rentschler) (Year: 2006).*

CN105983287A_ENG (Espacenet machine translation of Cheng) (Year: 2016).*

CN106422617A_ENG (Espacenet machine translation of Ge) (Year: 2017).*

CN106362538A_ENG (Espacenet machine translation of Li) (Year: 2017).*

CN103968405A_ENG (Espacenet machine translation of Zhao) (Year: 2016).*

RU2527772C1_ENG (Espacenet machine translation of Mnushkin) (Year: 2014).*

CN105983287A_ENG (Espacenet machine translation of Chen) (Year: 2016).*

* cited by examiner

CONDENSATION DEDUST-DEMISTER SET

FIELD OF THE PRESENT INVENTION

The present invention relates to a dedust-demister device for flue gas etc., particular to a condensation dedust-demister set, which can mostly be applied to environmental protection field to dedust and/or demist, particularly to wet flue gas and saturated flue gas, such as desulfurization and/or denitrification tower, bubbling tower, various washing tower, etc., as well as all sorts of gas including vapor containing dust to be removed, mist containing aerosol to be removed, and liquid containing deposit to be removed. This device can also be applied to the separation of liquids or solid with different densities from each others.

BACKGROUND OF THE PRESENT INVENTION

Today, whereas the requirements of national development and human civilization betterments, the environmental protection technology must go ahead, no harmonious environment no development, what implied is apparently exhibiting in the governmental policies of conditions of construction, hereby, to enterprise, the term of super-pure emission, is the problem what must be considered firstly.

This condensation dedust-demister set is just a solution of super-pure emission for enterprise!

SUMMARY OF THE PRESENT INVENTION

This invention has drawn a device to dedust and/or demist t for flue gas, its significance lies in the practice of this device enabling dedusted and demisted flue gas to the extent of super-pure emission with lower cost.

The present invention brief introduction:

The condensation dedust-demister set, comprises at least one of following demister: a condensator, a refluent demister, a large curve demister, a mixture curves demister and a super-sine demister, thereinto, said condensator with a shell style heat-conductible pipeline to convey refrigerating medium, via the effect of evaporation and expansion of refrigerating medium, can condense dust contained inpure gas into mist/haze; Said condensator and each demister can be assembled individually, said shell style pipeline can be a multiple shells passage.

Said refrigerating medium can flow inside a shell journey passage of said shell style pipeline, or flow inside a tube journey passage of said shell style pipeline, or flow both inside shell journey passage and tube journey passage of said shell style pipeline simultaneously in the case of multiple shells.

Said refrigerating medium is of utilizable common one including a compressed gas which can be used as refrigerating medium.

At least one of said shell style pipeline with gas collecting boxes assembled at each end running through a section of flue gas flow forms a demisting module, and at least one of said demisting module covers the whole section of flue gas flow; Or at least one middle joint position is set to join two of said shell style pipeline of said demisting module; Or at least one transition gas collecting box is located at middle position of said demisting module to join said shell style pipelines to form another demisting module; Or at least one middle gas collecting box is located on said demisting module to form another demisting module, at least one said demisting module gets through the whole section of flue gasflow; A demisting module can comprise a willful combination of at least one of said joint methods above; at least one of said demisting module covers a whole section of flue gas flow. The number of shell style pipelines contained in one demisting module may be 1-100, usually can be set as 10-30; The number of said various joint positions depends on the diameter of tower, the conditions of assembly, the intensity of structure of demister elements etc., usually can be set as 0-30. In this invention the term section of flow denotes a section or a similar one of flowing passage of flue gas or liquid.

The surface of elements with fundamental refrigerating function of said condensator can be designed with heat radiating elements or frames. Said elements with fundamental refrigerating function connotes a least frame or structure of refrigerating or cooling function of demister such as a piece of shell style pipeline or cavity style pipeline in present invention, additionally a usual heat-conductible iron plank, one piece of tube, etc..

At the first class site of demister layer is located with said condensator; At the second class site of demister layer and the possible consequent class sites of demister layer are located with at least 0 said condensators simultaneously, on said sites above but not the first class all sorts of demister of present invention can be located. This configuration is designed for super-pure emission, but all demisters including condensator in this invention can be installed individually. The sequence of said classes is arranged in a method along with the flowing direction of flue gas from front to back, said sites are named as first class, second class etc.

When the dust contained in raw gas is less than 20 mg/Nm3 or the emission standard is relatively lower or the condensator locates on a site except the first class, at least one cooling medium or mixture cooling medium of water, oil and gas can substitute for said refrigerating medium, especially the environmental air around, a boiler supplied wind, a lower temperature flue gas emitted;

When the flue gas cooled deeply going to be emitted into environment needs to be heated, a pure gas heater in such project may be designed with shell style pipeline.

Illustrated as FIGS. 4, 5, 6 and 11, the demisting element of said refluent demister comprises at least one demisting vane with at least one refluent curve of section of said vane superposed each other to force flue gas to reflow; some Broken lines can substitute for said refluent curve as a substitution solution; The direction of said refluent curve can willfully be set at will; Said refluent curve denotes two random tangents of two sides of section curve of demister vane can form a least angle opposite flue gas passage less than or equal to 90°, the refluent flow implies herein the change of flow direction of flue gas is more than or equal to 90°.

The unit layer of demisting module comprises said demisting element via composing each other, one demisting module comprises at least one layer of said unit layer, one layer demister occupying wholly flow section of flue gas comprises at least one demisting module; Said composing each other indicates all kinds of demisting element shapes and its changes which include but do not be limited into what said in this invention and include what can be reasonably imagined, and indicates all sorts of possible compositions of layers such as back-forwards, left-rightwards and up-downwards, illustrated as FIGS. 4, 5, 6, 7, 9 of surface structures, as FIG. 11, 12 of mixture curve vanes elements containing refluent curve vanes, the number of demister vanes of demisting element can be 1-10 pieces, normally 3-5 pieces.

A demister which fundamental function element for demisting is vane are designed with a drain; and/or with a collecting liquid walls; and/or with a venturi-channels or similar one for flue gas comprising vanes nearest each other, and/or with parallel flue gas channel, said venturi-channel and parallel channel can comprise various mixture flue gas channel; and/or with convexities which aim at accelerating and disturbing flue gas flow and/or with no intended flow leading frames or structure at import and/or export of vane for flue gas, the term intended implies mainly or merely designed to accomplish a predetermined aim; some broken lines can substitute for said various section curve of vane, or frame or structure on vanes as a substitution solution; The surface met flue gas of demister is designed with at least one frame of vertical drain, convexity, concave, hole, hamulus, convex slot, concave slot, cranny, etc., what aimed at said various frame and structure lies in disturbing flue gas flow field, so said various frame and structure include whatever can disturb flue gas flow field; All said above various technology features can be applied to a demister individually.

Illustrated as FIG. 11, said venturi-channel or similar one denotes a flue gas passage section is similar to section of venturitube to accelerate the velocity of flue gas, which can be limited out by two section curves of vanes nearest each other; Said parallel flue gas channel denotes a section curve of demisting vane can be obtained via other section curve of demisting vane in one same demisting module to be moved parallelly.

Said refluent curve of refluent demister can be designed as a large curve to form another demisting vane; Vanes with said large curve and said refluent curve can together form various mixture curve vanes demisters; Some broken lines can substitute for a section curve of various said vanes as a substitution solution; Said large curve denotes the random tangents of two sides of section curve of demister vane can form a least angle opposite flue gas passage more than or equal to 90°, illustrated as 121 and 122 of FIG. 12, herein the change of flowing direction of flue gas is less than or equal to 90°.

The section curve of demisting vane of said super-sine demister is a sine curve or similar one which amplitude value is more than or equal to 1, or is a curve with absolute value sine shape, or comprise a sine curve joined a absolute value sine curve; Some broken lines can substitute for the section curves of various said vanes as a substitution solution.

BRIEF DESCRIPTION OF THE DRAWINGS

This invention is described in more detail below on the basis of theories drawn out in this invention with reference to the accompanied drawings.

In the drawings.

DESCRIPTION OF THE PREFERRED EMBODIMENTS

Herein give a detailed description for the present invention assisted with attached figures as follows.

The Elastic Collision of Tiny Dust

Today the difficult problem of super-pure emission for flue gas lies in getting rid of tiny dust, a flue gas treated with the method of wet spraying can wholly carry the dust with diameters of 0-15 μm, including PM2.5, can carry 50% of dust with diameters of 15-250 μm, but dust with diameters more than 500 μm cannot be carried. Because the surface tension of water the tiny dust will occur elastic collision with water drop when impacting each other, so the tiny dusts are difficult to remove, they will fly over along with the flue gas. But when refrigerated or cooled the vapor within saturated flue gas will be condensed on the surface of tiny dust as well as SO3 aerosol and Hg0 etc., then mist/haze is created.

No Destruction No Construction

Because the diameters of tiny dust and mist/haze condensed by condensator are too little so their nature is same to the nature of wind, the normal demister or deduster with centrifugal effect to work are impossible to collect then remove, in order to demist or dedust must disturb the flow of flue gas to increase the odds of collision and amalgamation to increase their diameters, consequently to be collected and then demisted by centrifugal demister or deduster such as refluent demister etc..

The Condensator

Figure 1:
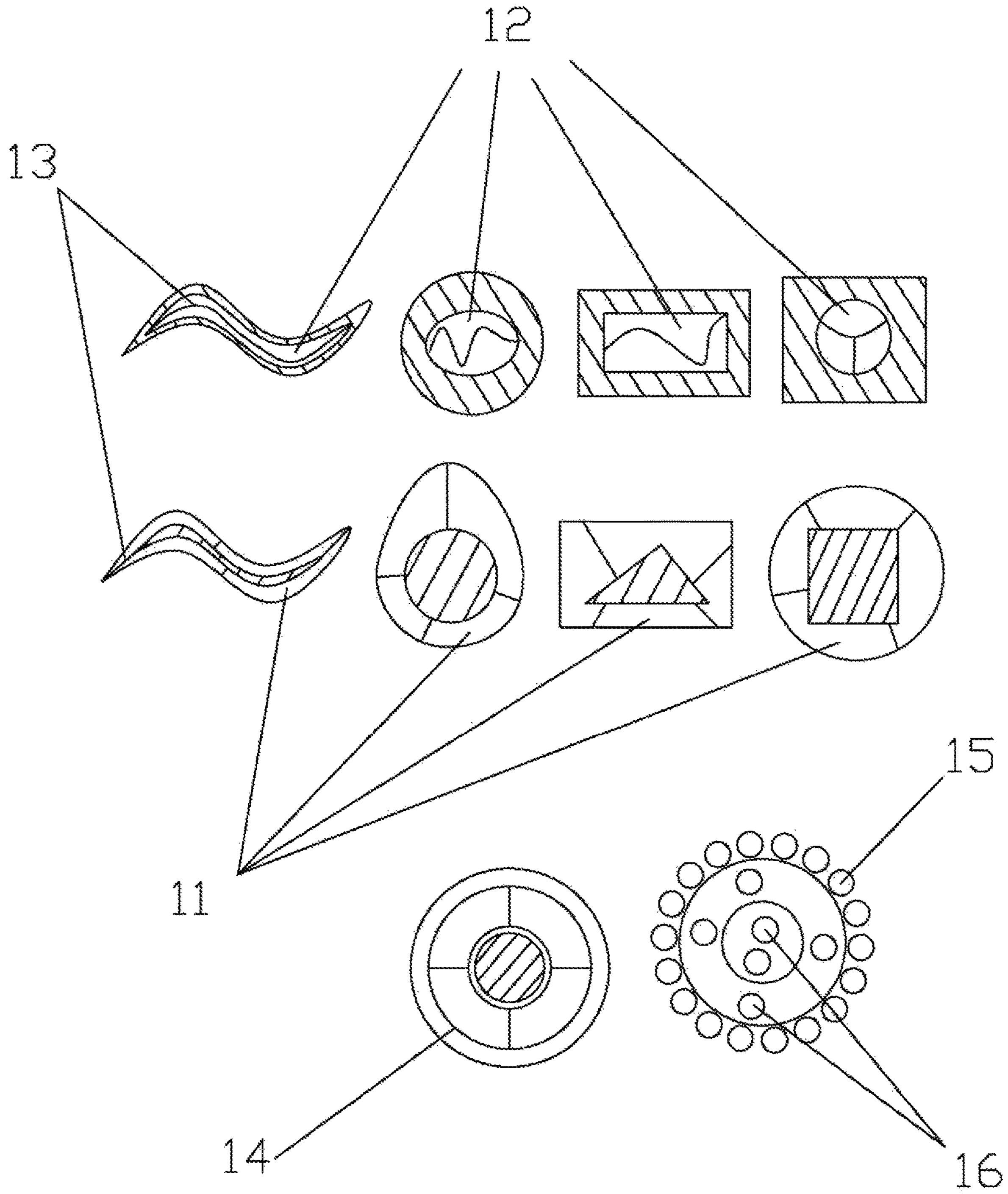
FIG. 1 sketch maps of the sections of various shell style pipelines.

The present condensator with shell style heat-conductible pipeline to convey refrigerating medium via its effect of evaporization and expansion will condense dust contained in raw gas into mist/haze. Said shell style pipeline comprises shell journey passage and tube journey passage with all kinds of sections including circle, square, wave shape, etc. inserted together to form a least function element for cooling flue gas, illustrated as FIG. 1 of sketch maps of the sections of various shell style pipelines, said shell journey passage comprises the section between two section curves of pipelines inserted together illustrated as 11. Said tube journey passage comprises the section inside the section curve of innerest pipeline illustrated as 12, which may be a solid material substituted for flow medium, some disturbing and/or supporting elements 13 inside shell journey passage may be designed, said supporting elements can be assembled at two ends of said shell style pipeline, the refrigerating medium flows inside shell journey passage but not the tube journey passage, the solution said above can keep stability of structure of present condensator and utilize refrigerating medium efficiently. As the possibility of lower temperature of flue gas cooled by refrigerating medium, said refrigerating medium should be flowed inside tube journey passage and the shell journey passage should be filled with heat-conductible medium flow or not as buffer medium, such as water, air or oil etc.. Said shell style pipeline can be more than 2 layers shell structure such as multiple tube with supporting elements illustrated as 14 or without, in order to conduct heat more efficiently multiple shell style pipeline may be designed, which belongs to the shell style pipeline, for another instance, around shell style pipeline or tube style pipeline some tubes 15 are set to obtain more heat-conducting area and more disturbed effect consequently more efficient cooling effect, or in the interest of disturbing for flow some screw tubes and/or wave tubes etc. 16 can be set in the shell journey passages and/or tube journey passages. Said multiple shell style passage/pipeline namely a multiple shells structure of more than 2 layers, and/or several shell journeys and/or tube journey passages annexed several shell journeys and/or tube journey passages beside itself. Now, Said shell journey passage denotes 2 or more than 2 independent closed section curves comprises a possible least flow section which contains at least one independent closed section that cannot be cut off; which can be named shell journey 1, shell journey 2 etc.; Said tube journey passage denotes 1 independent closed section curve comprises a possible least flow section which contains no independent closed section that cannot be cut off; which can be named tube journey 1, tube journey 2 etc.. The definition above of shell journey passage and tube journey passage are applicable to all the significance and concepts of shell journey passage and tube journey passage in present invention, and the concept and significance of said cavity style pipeline is equal to said tube journey passage in present invention.

Figure 2:
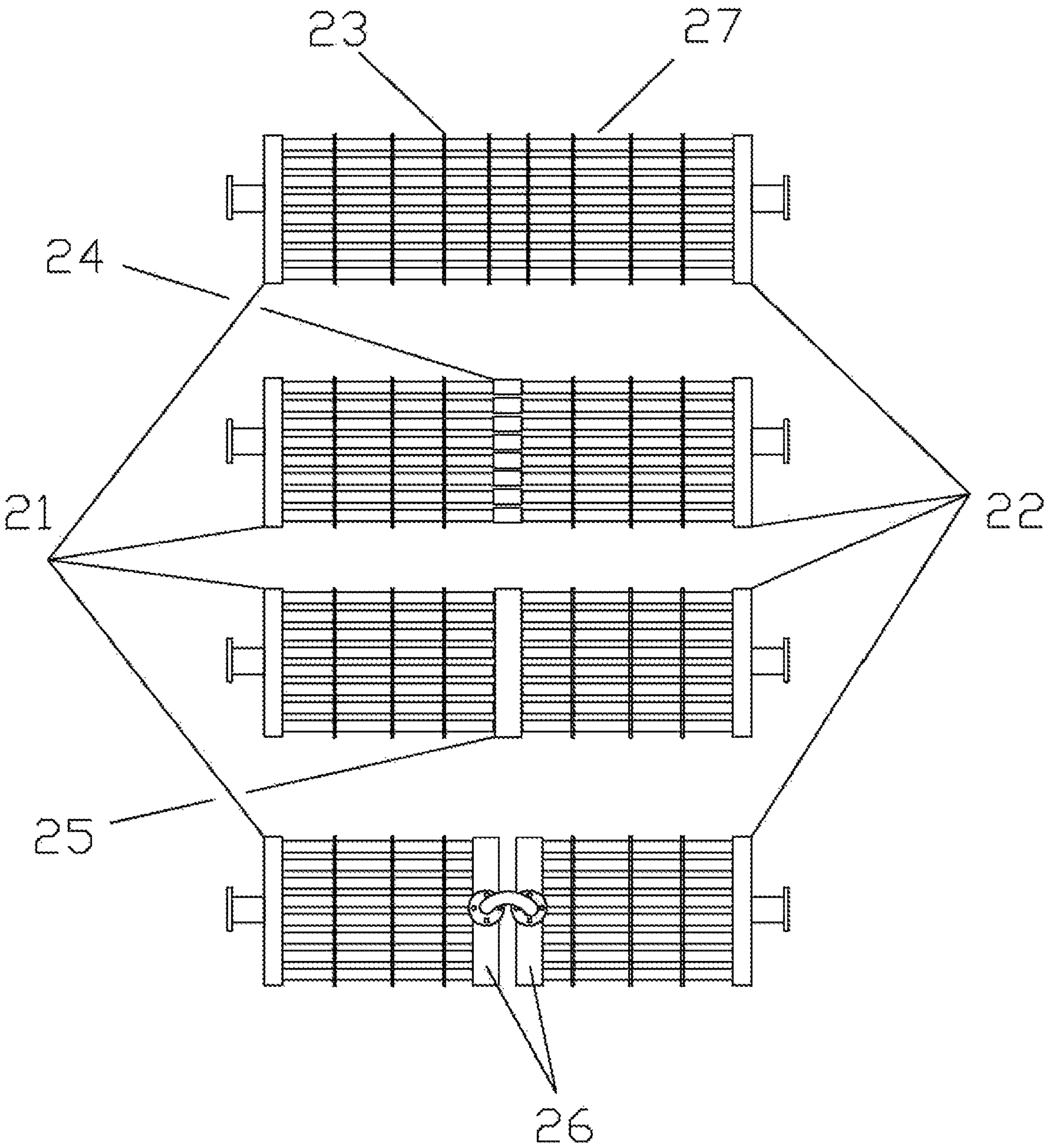
FIG. 2 planform views of the different condensator modules.

Illustrated as FIG. 2, a demisting module 27 comprises at least one of said shell style pipeline running through section of flue gas flow and two gas collecting boxes 21 and 22 assembled at two ends, several supporting boards 23 may be assembled between two gas collecting boxes, and at least one of said demisting module covers a whole section of flue gas flowing; Or at least one middle joint position of said shell style pipeline is set to join two of said pipeline with joint element 24; Or at least one transition gas collecting box 25 is located at middle position of said demisting module 27 to join said shell style pipelines to form another demisting module; Or at least one middle gas collecting box 26 is located at moddle position of said demisting module 27 to form another demisting module, via the connection of said boxes 26 the demister will get through a section of flue gas flow; One layer of demisting module can comprise a willful combination of at least one of said joint methods above; at least one of said demisting module covers a whole section of flue gas flow. The number of shell style pipelines contained in a demisting module may be 1-100, usually can be set as 10-30; The number of said various joint positions depends on the diameter of tower, the conditions of installation, the intensity of element structure etc., usually can be set as 0-30. In this invention said section of flow denotes a section or similar one of flow passage of gas or liquid.

Said refrigerating medium of the condensation dedust-demister set in present invention is of utilizable common one including a compressed gas which can be used as refrigerating medium, said a compressed gas gas can be one of the followings: air, nitrogen, hydrogen, oxygen, nature gas, liquefied petroleum gas, etc., as well as a supplied wind and/or a flue gas of a boiler. The heat energy generated by refrigerator motor should be utilized to heat pure gas via a flue gas heater with said conductible shell style pipeline which may be designed with heat radiating elements or frames on its surface.

Figure 3:
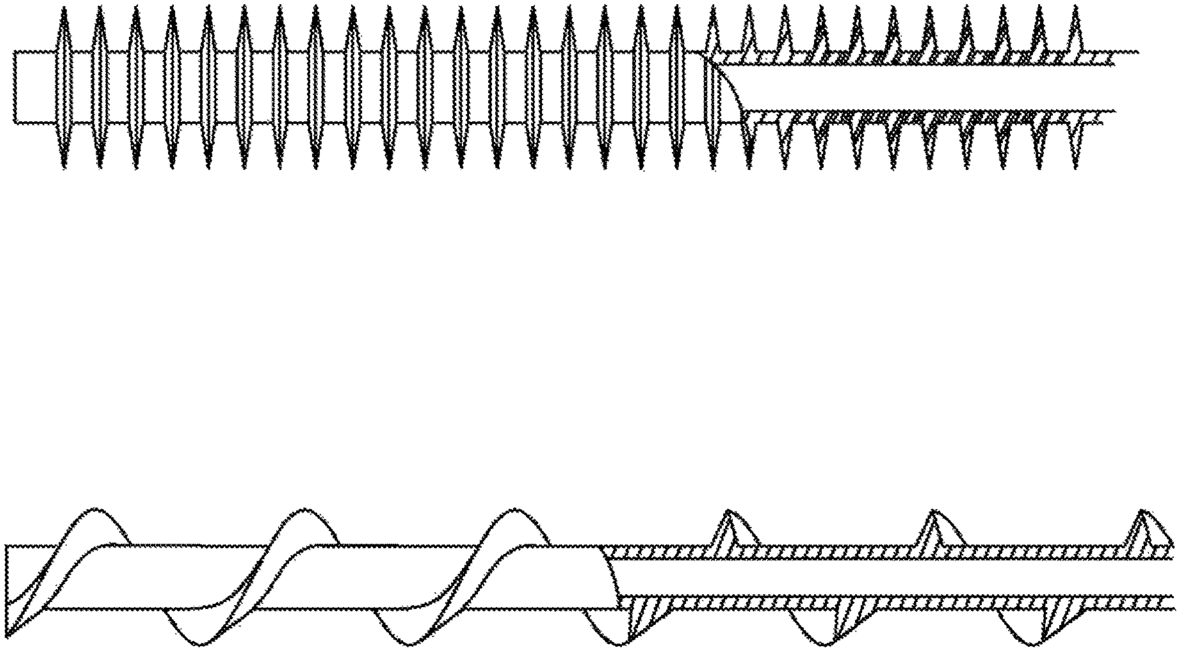
FIG. 3 cutaway views of the heat radiating pieces and heat radiating screw of condensator or heater for flue gas.

For more better effect of refrigerating, the elements surface of fundamental function to refrigerate of the condensator in present invention can be designed with heat radiating elements or frames, such as wing slice, screw slice etc. illustrated as FIG. 3, Said elements of fundamental function to refrigerate connotes a least frame or structure of refrigerating or cooling function of a demister such as one passage of shell style pipeline or cavity style pipeline in present invention, as well as one usual heat conductible iron plank, one piece of tube, etc..

Present invention sets the condensator located on the first class site to meet wet flue gas firstly, along with the direction of flue gas flow various demisters of present invention are located on the sites following said first class, the condensator will take the effect of tube type demister at the same time, a large numerous slurry drops together with mist/haze condensed by condensator will be collided with shell style pipeline consequently be pooled to be dripped, thereby this method can efficiently get rid of slurry drops and hazes containing dusts, at the same time, the large numerous slurry drops usually in a number of 10000-40000 mg/Nm3 can also catch a large number of mist generated by condensator, especially for a tower which flue gas is not in saturation or relatively less of amount of spray slurry this method appears more advancement. For the delay of heat conducting and the course of misting the condensators should be set at several sites behind the first class, said class is usually divided by a set of supporting frame in a distance of usual 2 meters between them on which one set of demister will be installed.

When a dust contained in raw gas is less than 20 mg/Nm3 or the emission standard is relatively lower or the condensatoris located on a site except the first class, the refrigerating system can be changed to cooling system, at least one of cooling medium or mixture cooling medium of water, or oil and gas can substitute for said refrigerating medium, especial an environmental air around, a boiler supplied wind, a lower temperature flue gas emitted, and a cavity style pipeline including a cavity vane with the refluent curve or the large curve or the super-sine curve or the mixture curve of said demister can substitute for segments or whole of said shell style pipeline, said two substitutions can be not in simultaneity. Said cavity style pipeline, denotes one independent closed section curve comprises one possible least flow section which contains no independent closed section that cannot be cut off; namely said cavity wrapped by its closed section curve in radius direction will be conveyed one current medium, referring to FIG. 1.

The Refluent Demister

Figure 4:
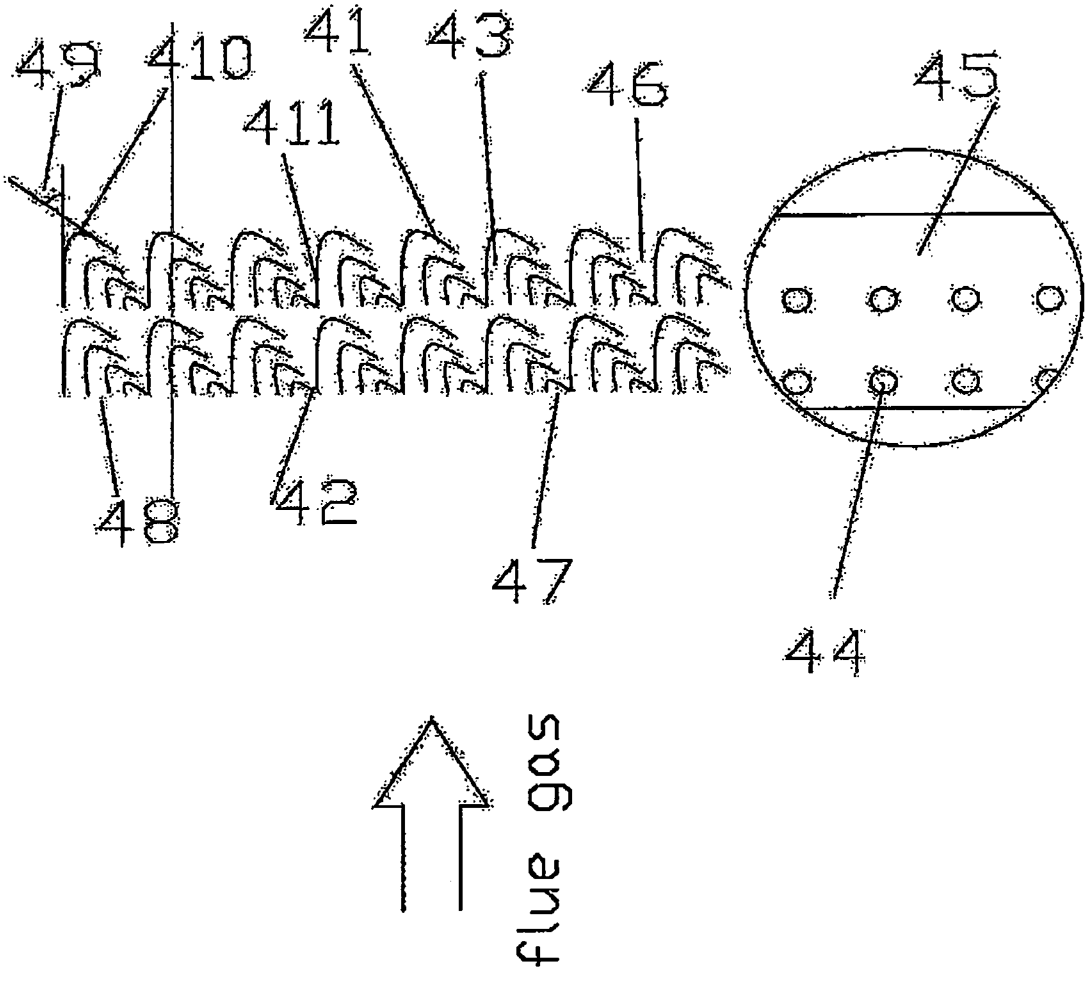
FIG. 4 sketch map of section curves of various refluent demisters.
Figure 5:
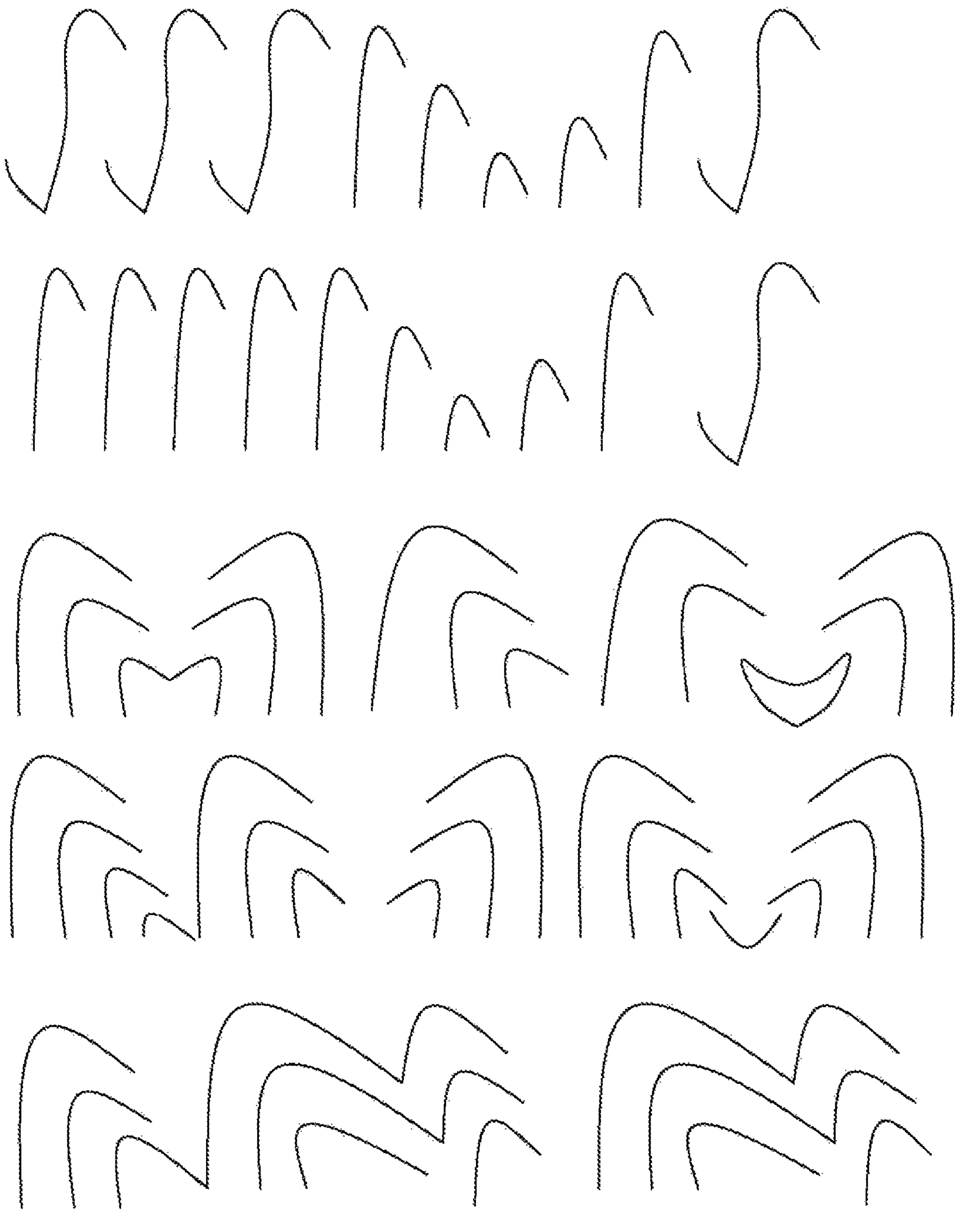
FIG. 5 sketch maps of compositions of demisting elements of refluent demister.

Illustrated as FIG. 4, the refluent demister, its demisting element 48 comprises at least one demisting vane 41 superposed each other with at least one refluent curve of said vane section which makes flue gas to be refluent opposing to its original direction in flue gas channel, said section denotes the section at radius direction namely width direction of vane, without special explanation in present invention the section of demisting vanes all denote a section at radius namely width direction of vane. Because the centrifugal principle the direction of refluence opposing to mustn't be the direction of the raw gas before entering into demister, so the direction of fluent curve can be anywhere willfully. Said refluent curve 410 denotes the section curve of demister vane 41 which random tangents of two sides can form a least angle 49 opposite flue gas passage less than or equal to 90°, herein said refluent implies the change of flowing direction of flue gas is more than or equal to 90°. The curvature of said refluent curve should be as larger as possible to obtain a better centrifugal effect for demisting, the larger slurry drops caught by demisting vanes will be blew up to collecting liquid wall 411 configured to hold back and collect drops and mist comprising demisting vane or parts of demisting vane or independent vane. Drops and mist held back by said collecting liquid wall will be pooled down to drain 42 which comprises nearest vanes each other or one bended vane or an independent vane such as FIG. 5. The slurry pooled in said drain forced by kinetic pressure of flue gas will be drained out through hole 44 within two end boards and possible supporting boards 45 of a demisting module or drained out directly when without end boards.

The flue gas sprayed out from flue gas passage 43 will be mixed together at turbulent zone 46 to increase the diameter of mist, the large drops sprayed out are collected by collecting liquid walls to drain, and a disturbed zone 47 can increase probability of pooling of slurry drops.

Figure 11:
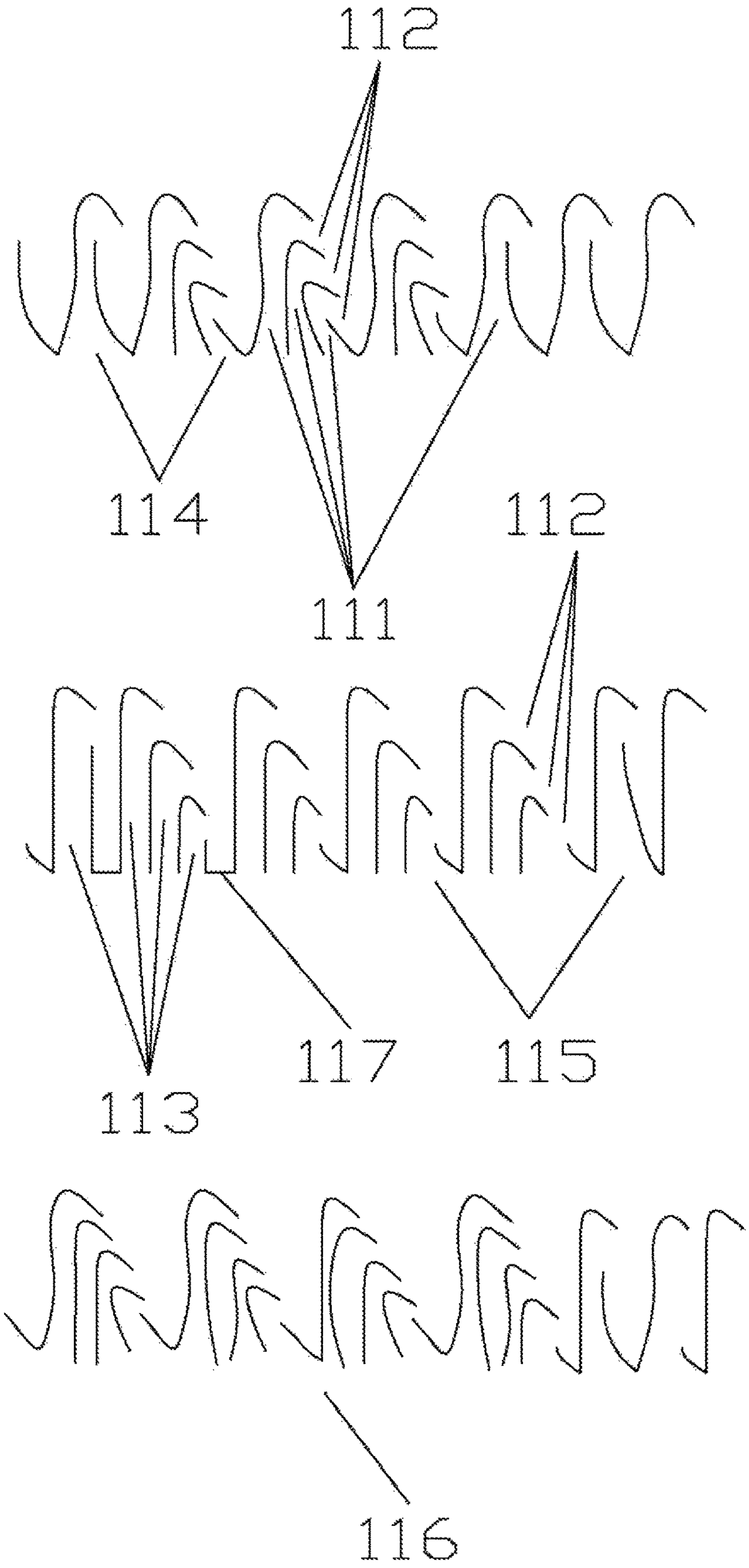
FIG. 11 sketch maps of compositions of venturi-channel, as well as parallel channel and mixture channel of refluent demisting vanes.

The nearest demisting vanes of the refluent demister compose a venturi-channel or similar one 111 in FIG. 11 for flue gas, said venturi-channel or similar one denotes a flue gas passage section similar to the section of venturitube which can accelerate the velocity of flue gas, can be limited out by section curves of vanes nearest each other, several broken lines can substitute for said curves. Said nearest demisting vanes can also be set as parallel flue gas channel 113 which denotes a section curve of demisting vane can be obtained via other section curves of demisting vanes in a same demisting module to be moved parallelly. Said above flue gas passages can form various mixture flue gas passages 116, changing disturbed zone 47 to confluent entrances 114 and 115 or drains 117, and exports 112 of flue gas channel can be designed as acceleration or deceleration style.

Said venturi-channel or similar one can be applied to the vanes of the super-sine demister, the large curve demister, the mixture curve demister etc..

In a permissible extent of demisting capability the demisting element can be various in style, can be designed with various structures and frames of dermisting vane surface illustrated as FIGS. 5, 6, 7, 9, 11 and 12 etc., containing but do not being limited into what mentioned in this invention and containing what can be reasonably imagined: the passages of flue gas with multiple refluent curves, the exports of passage of flue gas being opened upwards, the angle of the entrances of passages of flue gas opposite the original flue gas flow direction before entering into said passages being less than 190|°, various composition of various demisting element of present invention. Several broken lines can substitute for section curves of said vanes as a substitution solution, One demisting module comprises at least one layer of unit layer, said unit layers superposed each other may be joined or not each other in one demisting module, one layer of demister occupying wholly flow section of flue gas comprises at least one demisting module, said demisting elements are assembled each other in a row parallelly to form a unit layer, said assembled each other contains but do not be limited into what mentioned in this invention and contains what can be reasonably imagined: the number of styles of demisting vanes included in one demisting module; the number of demister vanes of demisting element, which may be 1-10 pieces, normally 3-5 pieces; surface structures illustrated as FIG. 4, 5, 6, 7, 9, mixture curve demisting elements containing refluent curve vanes in FIG. 11, 12; various assembly at will between demisting elements, the unit layers, the demisting modules, and the imports direction of flue gas 43; the drains and collecting liquid walls which can be set more than one or do not be set; the staggered or ordered disposals of demisting element between unit layers such as FIG. 5. Different models said above have different functions for demisting, a model such as 65 in FIG. 6 can be adapted for a lower flue gas velocity or a lower load, but model of 66 can be adapted for a higher flue gas velocity or load.

The Drains and the Collecting Walls of Demister Proffer a Solution of Higher Efficiency of Demisting for slurry drops blew up and sprayed out while a flue gas in a higher velocity.

The Large Curve Demister & Mixture Curve Demister

In some possible cases of higher velocity of flue gas in horizontal flue slurry drops blew up will happen even if without accelerated flue gas in flue gas passages of demister, so the large curve demister is born for a solution.

Figure 12:
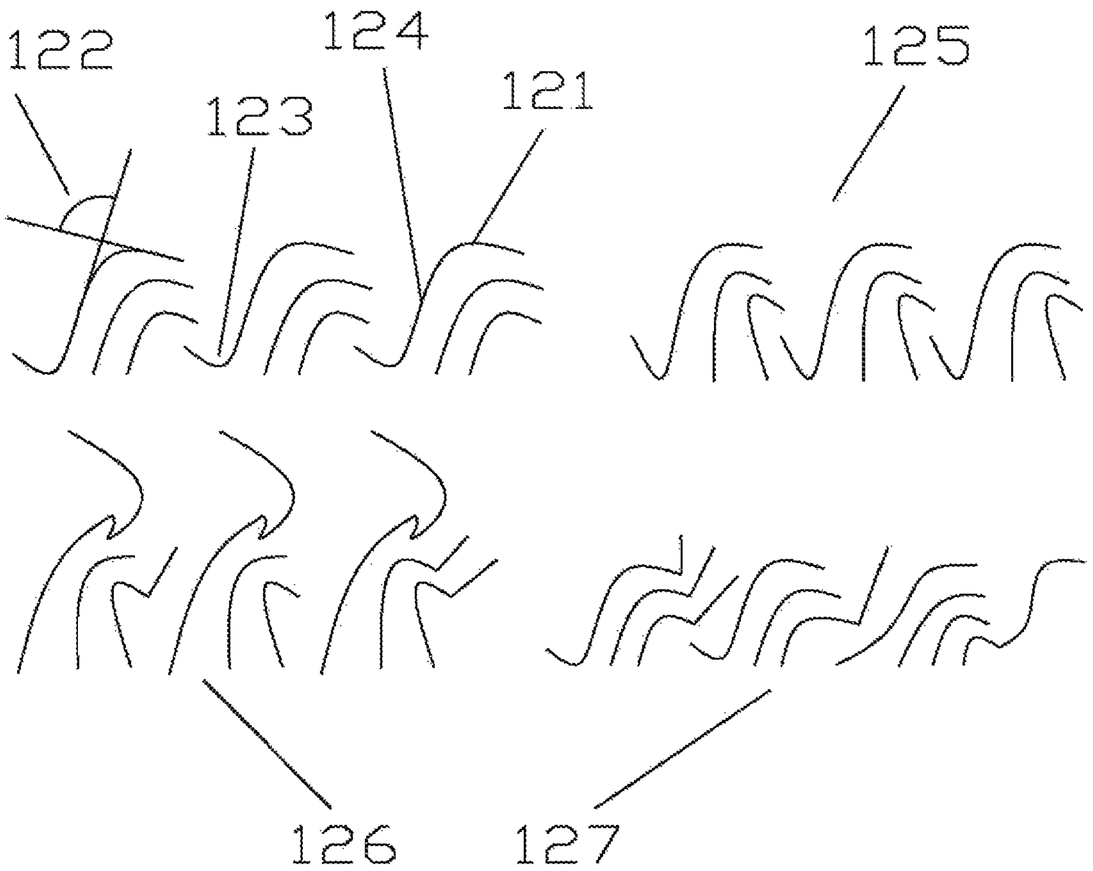
FIG. 12 sketch maps of section curves of large curves and mixture curves of demisting vanes.

Said refluent curve of the refluent demister can be changed to a large curve to form another demisting vane, illustrated as 121 of FIG. 12, said large curve 121 denotes the random tangents of two sides of section curve of demister vane can form a least angle 122 opposite flue gas passage more than or equal to 90°, illustrated as 121 and 122 of FIG. 12, herein the change of flowing direction of flue gas is less than or equal to 90°. 123 shows a drain and 124 shows a collecting liquid wall which are similar to refluent demister.

Vanes with said large curves and said fluent curves can together form various mixture curve vanes demisters, such as 125 in FIG. 12.

Some broken lines can substitute for section curves of various said vanes as a substitution solution.

The Super-Sine Demister

Figure 8:
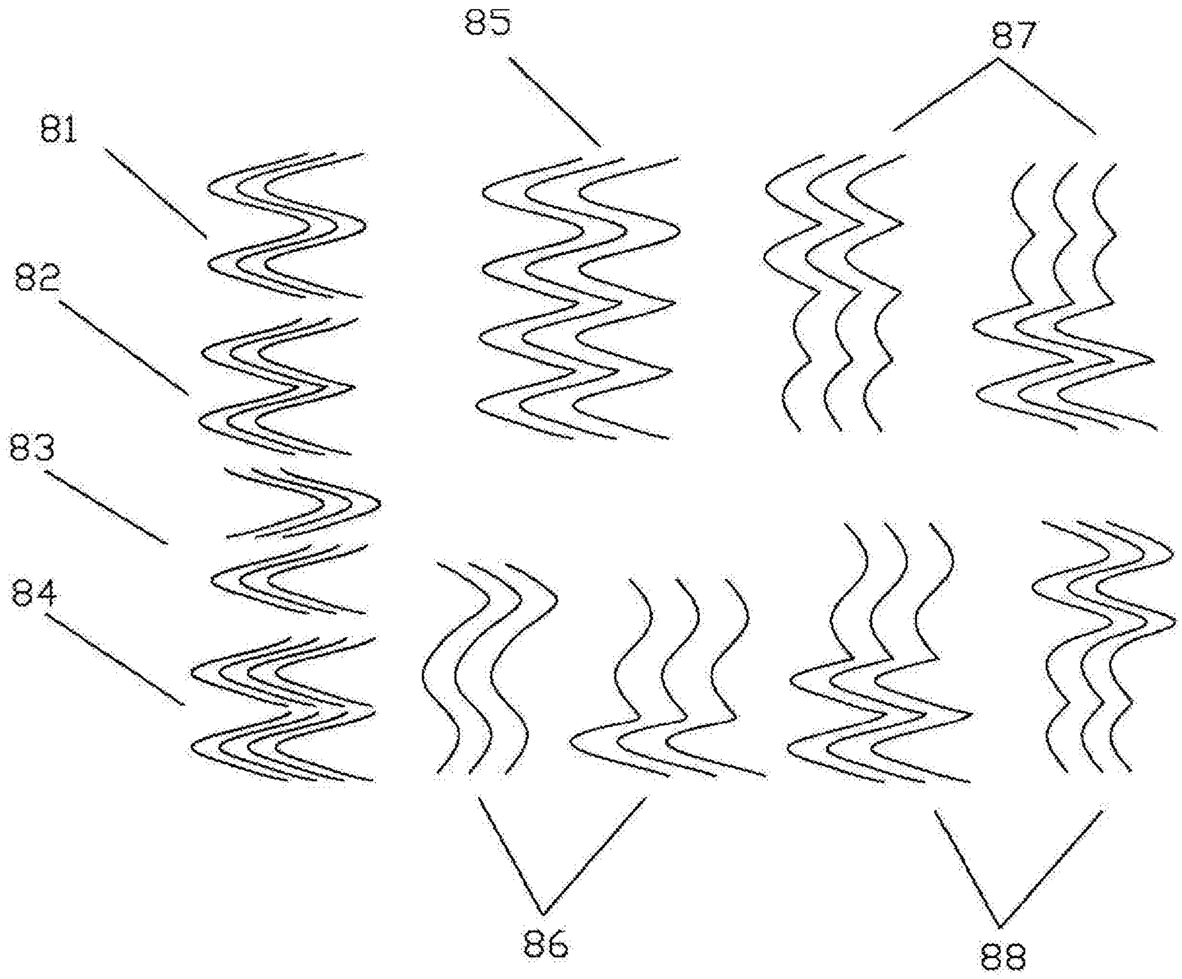

In some possible cases of a flue gas with lower velocity such as a lower load of a boiler an accelerating channel for flue gas of demister is needed. The super-sine demister intends to increase the centrifugal effect of flue gas inside its channel. Such as FIG. 8, a section curve of demisting vane of said super-sine demister with demisting function is a sine or similar one curve 81 which amplitude value is more than or equal to 1, or is a curve with absolute value sine shape 82, or comprise a sine curves joined an absolute value sine curve, such as curves of 85, 86, 87, 88.

One super-sine demisting module comprises at least one single layer, said single layer comprises at least one of various section curves of super-sine demister vanes said above, the directions of wave crest of near layers is same 84 or opposite 83 each other, at least one demisting module covers a whole section of flue gas flow.

Figure 6:
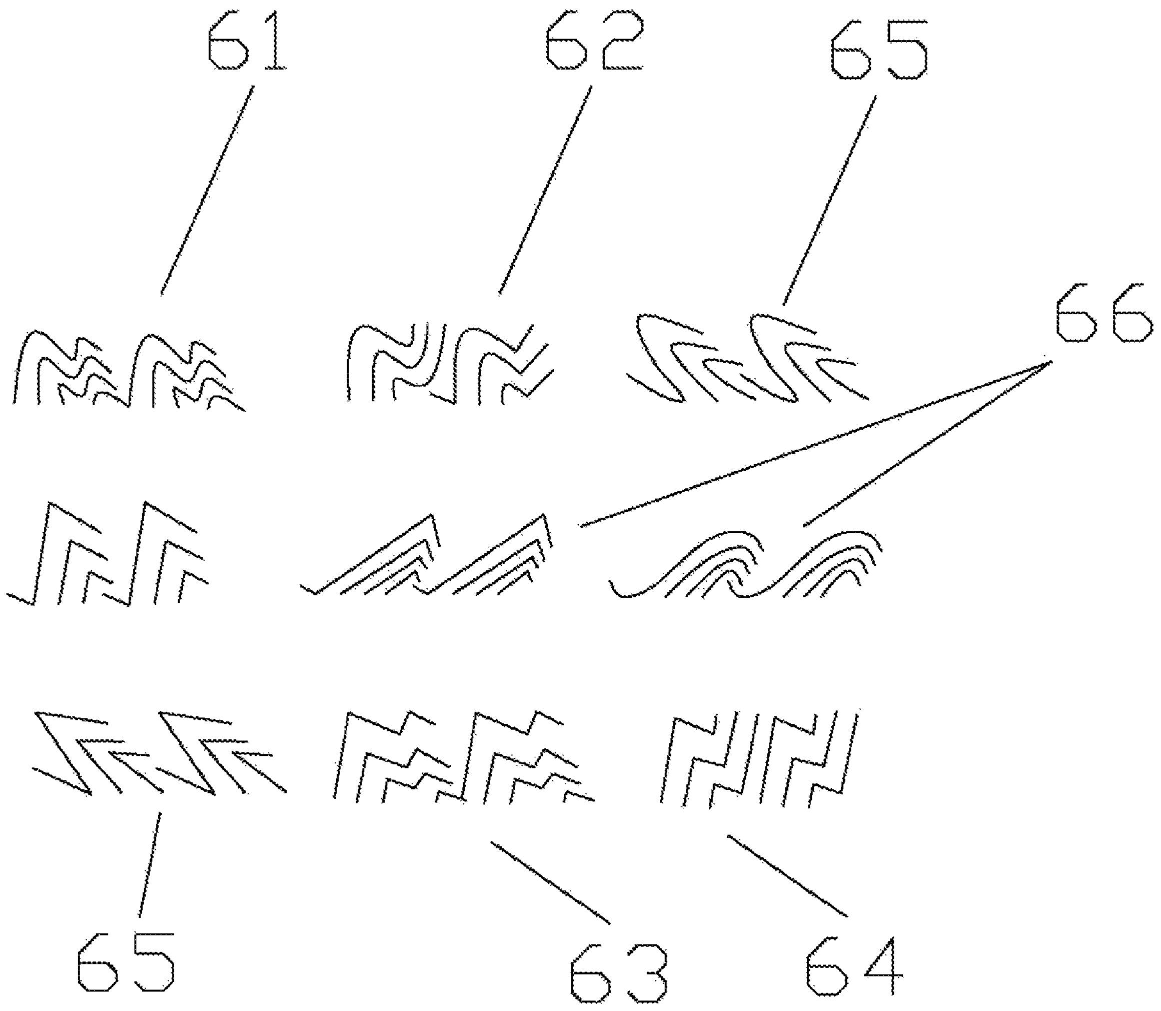
FIG. 6 sketch maps of shapes and its change of demisting elements of refluent demister.
Figure 7:
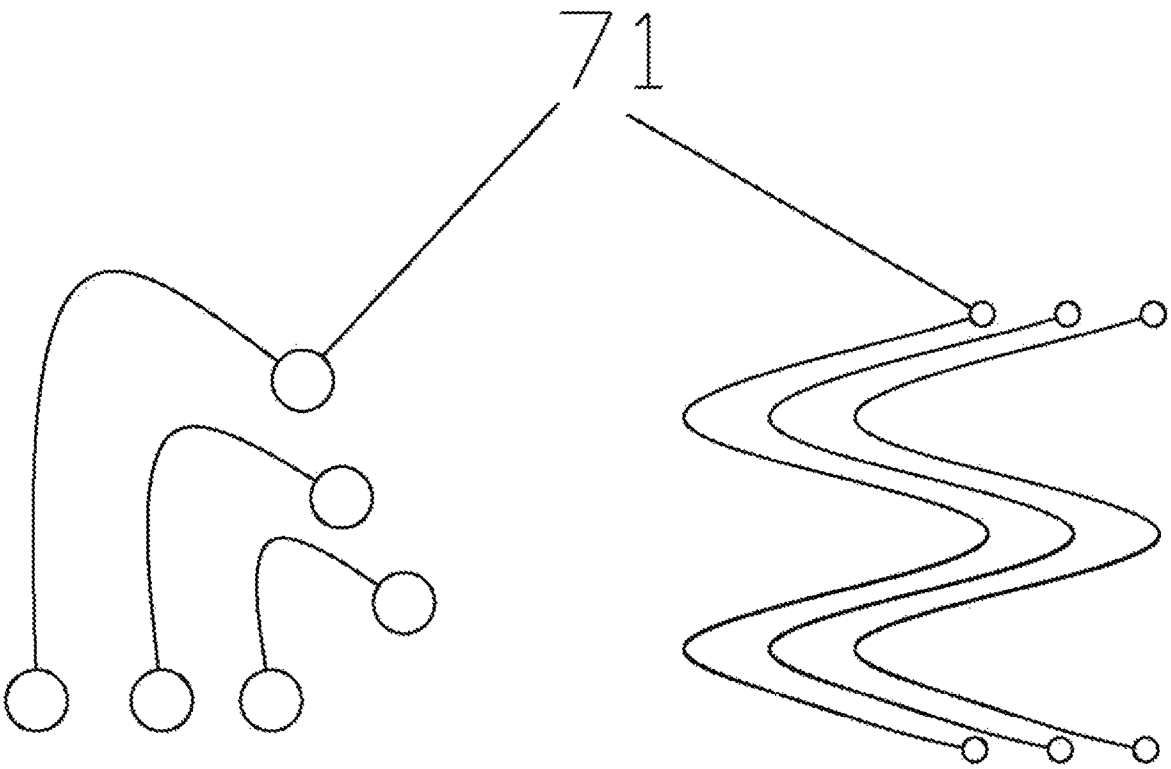
FIG. 7 sketch maps of venturi effect of demisting vanes with convexity at imports and/or exports of vanes for flue gas FIG. 8 sketch maps of sections and layers compositions of super-sine demisting vanes.

In a permissible extent of demisting capability the vane of super-sine demister can be various, Such as some broken lines substituting for section curves of said various vanes as a substitution solution, referring to FIG. 6.

Figure 10:
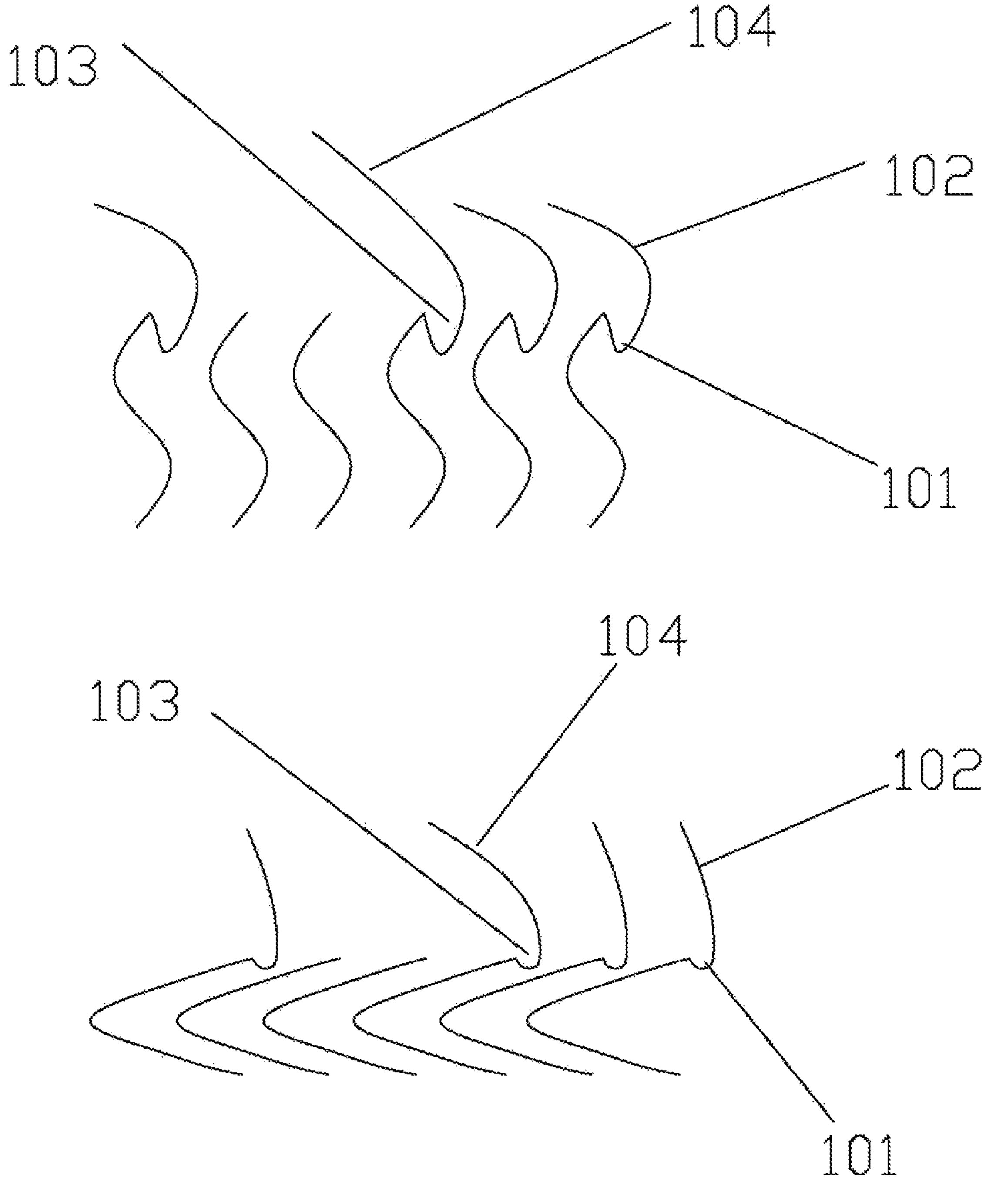
FIG. 10 sketch maps of drains and collecting liquid walls of super-sine demister along with normal wave demister.

For some reasons the phenomena of carrying slurry drops will occur probably, such as in a case of horizontal demister, illustrated as FIG. 10, on the vane top of super-sine demister or normal wave demister the drains 101 and collecting walls 102 are set to collect and drain slurry drops carried by flue gas, a common drain 103 and a common collecting wall 104 can be designed for several vanes nearest, which functions are similar to that of the refluent demister. Said methods above of setting drains and collecting walls can be applied to vanes of various super-sine demister, normal wave demister, broken line demister, can also be applied to vanes of a demister which fundamental function elements of demisting is vanes, such as vanes of the refluent demister illustrated as 61, 62, 63, 64 of FIG. 6, vanes of the mixture curve demister illustrated as 126 of FIG. 12, vanes of the large demister illustrated as 127 of FIG. 12, as well as a normal wave demister, a hollow wave demister etc..

A willful composition of at least one of said various drains and various collecting walls contained what can be imaged can be applied to a demister simultaneously.

The Disturbing Methods

Figure 9:
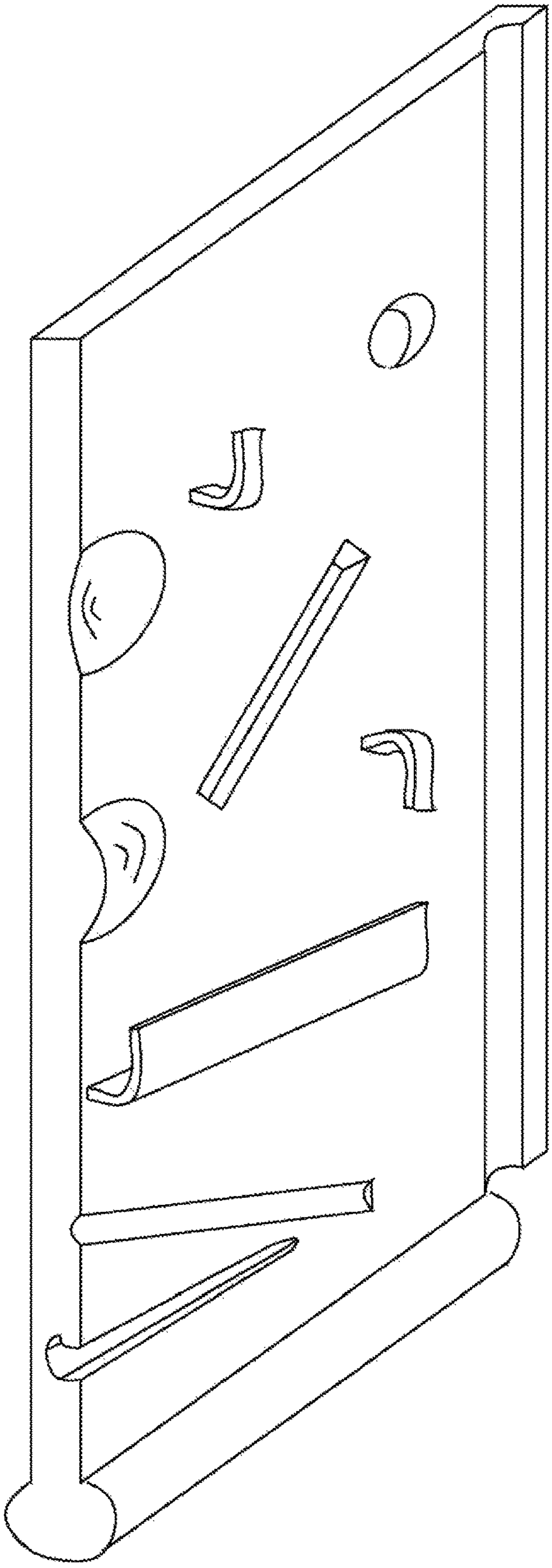
FIG. 9 axonometric drawing of various frames and structures on surface of demisting elements to disturb flue gas flow.

In order to increase the intensity of turbulence and the probability of collision each other of tiny mist/haze, such as FIG. 9, the surface met flue gas with demisting function of a demister is designed with at least one frame of vertical drains, convexity, concave, hole, hamulus, convex slot, concave slot, cranny, what aimed at said various frames and structures lies in disturbing flue gas flow field; Said above various assistant frames and structures can be applied to a demister individually.

A demister which element with fundamental function for demisting is vane are designed with convexity 71 at import and/or export of vane for flue gas, said demister can be one of the refluent demister, the large curve demister, the mixture curve demister, the super-sine demister, and a normal wave demister, a broken line demister, and so on, the convexity can accelerate the velocity of flue gas consequently enhance the venturitube effect so can remove haze more efficiently, also can increase the the intensity of turbulence so as to increase the probability of collision each other to be pooled together. Said convexity can be designed along with whole or parts of edge of vanes, or as something similar to a row of globes. Said edge should be a certain extent from edge to inner of vane.

As another apparent characteristic of present invention set, a demister element with fundamental function for demisting is vane is designed with no intended flow leading frame or structure at import and/or export of said vanefor flue gas. Said intended implies mainly or merely designed for a predetermined function, said flow leadingconnotes forcing a flow from a direction to another direction in a minimum extent of pressure loss and a maximum extent of flow field uniformity, said edge should be a certain extent from edge to inner of vane which can act as an element of flow leading normally.

While a demister installed vertical-wards and which vanes horizontal-wards a collecting liquid wall or a similar one may be needed to incline upwards a little to form a drain.

Each the condensator/demister of present invention can be installed horizontally or vertically, normally based on the direction of flue gas flow and/or the efficiency of demisting, and can be assembled as a style of plain or ridge.

The Economic and Social Benefit:

The present invention proffered a condensation dedust-demister set, which can accomplish super-pure emission of dust less than 5 mg/Nm3 and mist less than 10 mg/Nm3 effectively with lower cost and lower pressure loss of around 200 Pa, and can be adapted to a raw gas with dust more than 30 mg/Nm3 for super-pure emission. For dust of 60 mg/Nm3 contained in a raw gas, via multiple said condensators, being cooled deeply and/or multiple said refluent demisters etc. can be succeeded.

With being cooled deeply, present dedust-demister can accomplish dust emission of 0 mg/Nm3, with a heater for pure gas can accomplish mist emission of 0 mg/Nm3.

The present invention set can remove SO3 aerosol and Hg0 etc. simultaneously.

Statement:

Said above, others promised by law may draw out modifications and variations according to the structures and technology and principles of this invention, therefore that the appended claims are intended to cover such modifications and variations which are within the true scope and spirit of this invention.

What is claimed is:

1. A condensation dedust-demister set, comprising:

a condensator with a shell heat-conductible pipeline to convey a refrigerating medium configured to A condense dust contained in a flow gas into mist/haze; and at least one demister selected from a refluent demister with a refluent curve, a large curve demister with a large curve, a mixture curves demister with a mixture curve, and a super-sine demister with a super-sine curve installed individually to remove mist/haze and dust within a flow gas, each installed individually.

2. The condensation dedust-demister set according to claim 1, wherein said refrigerating medium flows inside a shell journey passage or a tube journey passage of said shell heat-conductible pipeline, or flows both inside said shell journey passage and said tube journey passage simultaneously.

3. The condensation dedust-demister set according to claim 1, wherein said at least one demister is a refluent demister with a refluent curve comprising at least one demisting element comprising at least one demisting vane that includes at least two demisting vanes that are superposed with at least one refluent curve to force flue gas to reflow; said at least one demister further comprising:

a drain to convey a pooled slurry; and/or a collecting liquid wall to collect drops of slurry.

4. The condensation dedust-demister set according to claim 3, wherein said refluent demister forms a layer covering a whole flow section of flue gas.

5. The condensation dedust-demister set according to claim 1, wherein said at least one demister is a large curve demister with a large curve comprising at least one demisting element comprising at least one demisting vane that includes at least two demisting vanes that are superposed with at least one large curve to force flue gas to change direction; said at least one demister further comprising:

a drain to convey a pooled slurry; and/or a collecting liquid wall to collect drops of slurry.

6. The condensation dedust-demister set according to claim 1, wherein said at least one demister is a super-sine demister with a super-sine curve comprising at least one demisting vane with:

a section curve with a sine shape with at least one amplitude value more than or equal to 1; or a section curve with an absolute value sine shape; or a section curve with a sine shape joined to an absolute value sine shape; said at least one demister further comprising:

a drain to convey a pooled slurry; and/or a collecting liquid wall to collect drops of slurry.

* * * * *